United States Patent [19]

Hersen et al.

[11] Patent Number: 5,035,379

[45] Date of Patent: Jul. 30, 1991

[54] MOVABLE AIRCRAFT ENGINE COWLING

[75] Inventors: René M. J. Hersen, Combs la Ville; Pascal-Marie P. M. Soutier, Le Havre, both of France

[73] Assignee: Societe Anonyme Dite Hispano-Suiza, Saint-Cloud, France

[21] Appl. No.: 504,869

[22] Filed: Apr. 5, 1990

[30] Foreign Application Priority Data

Apr. 5, 1989 [FR] France ............................. 89 04456

[51] Int. Cl.⁵ ............................................. B64D 29/06
[52] U.S. Cl. .............................. 244/129.4; 244/53 R; 244/110 B
[58] Field of Search .............. 244/129.4, 53 B, 53 R, 244/110 B; 292/8, 277

[56] References Cited

U.S. PATENT DOCUMENTS

| | | | |
|---|---|---|---|
| 2,417,945 | 3/1947 | Parker | 244/53 R |
| 2,421,689 | 6/1947 | Elkin . | |
| 3,067,968 | 12/1962 | Heppenstall | 244/53 R |
| 4,442,987 | 4/1984 | Legrand et al. . | |
| 4,549,708 | 10/1985 | Norris . | |
| 4,679,750 | 7/1987 | Burhans . | |

Primary Examiner—Joseph F. Peters, Jr.
Assistant Examiner—Carla Mattix
Attorney, Agent, or Firm—Bacon & Thomas

[57] ABSTRACT

A movable cowling for an aircraft is disclosed having a stationary fairing portion attached to an engine support pylon and a movable cowling portion. The movable cowling portion defines a generally longitudinally extending slot to accommodate the stationary fairing portion when the movable cowling portion is in its closed position to enclose the aircraft engine. The movable cowling portion, which may be generally annular in shape and have a generally "C"-shaped cross sectional shape, is attached to the engine by way of a telescoping beam. A portion of the beam is attached to the movable cowling and a second portion of the beam is attached to the engine. The movable cowling moves in a direction generally parallel to the longitudinal axis of the engine such that it has no portions requiring lifting about a hinge axis. A locking mechanism is provided between the movable cowling portion and the stationary fairing to lock the movable cowling portion in its closed position.

5 Claims, 2 Drawing Sheets

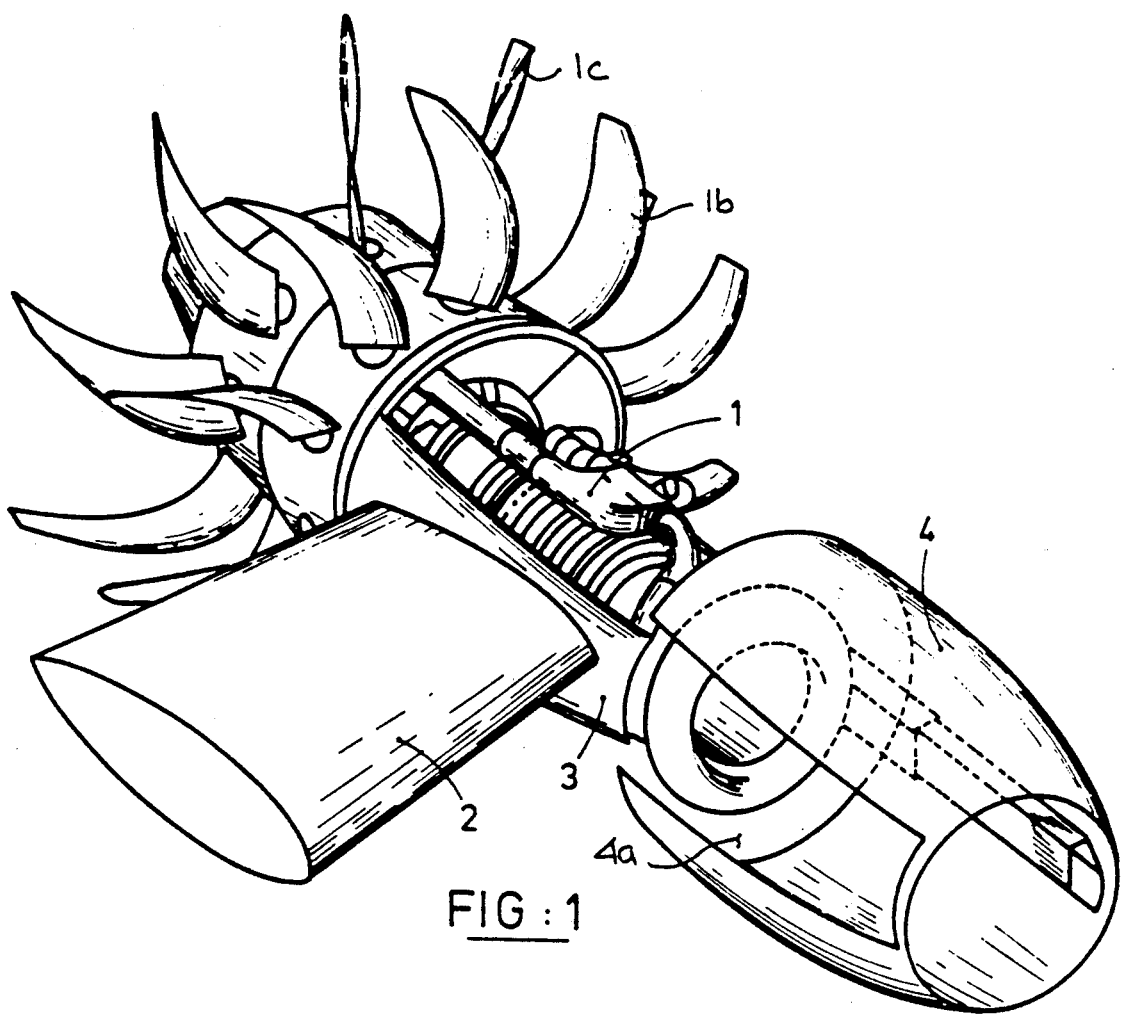
FIG:1
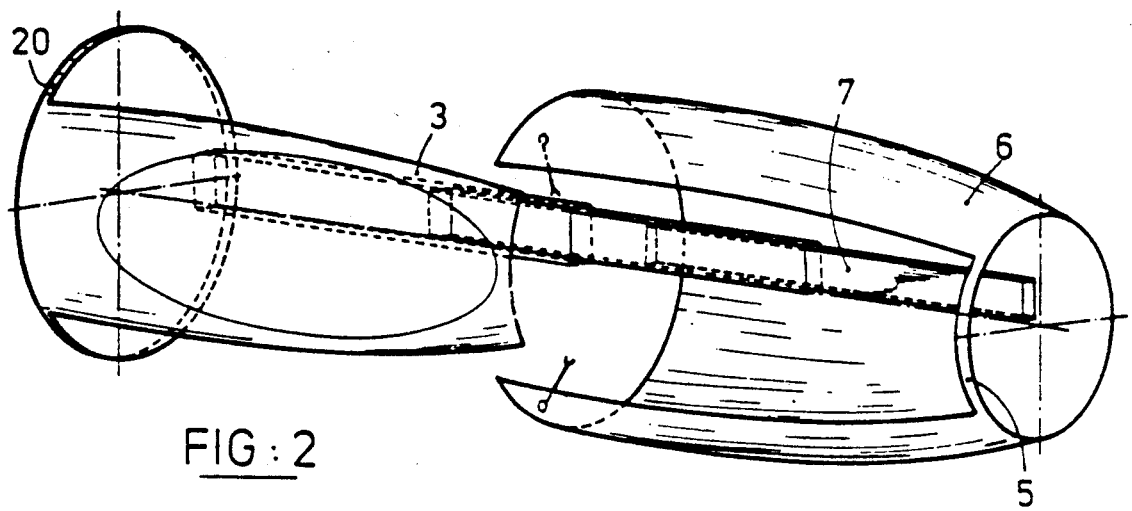
FIG:2

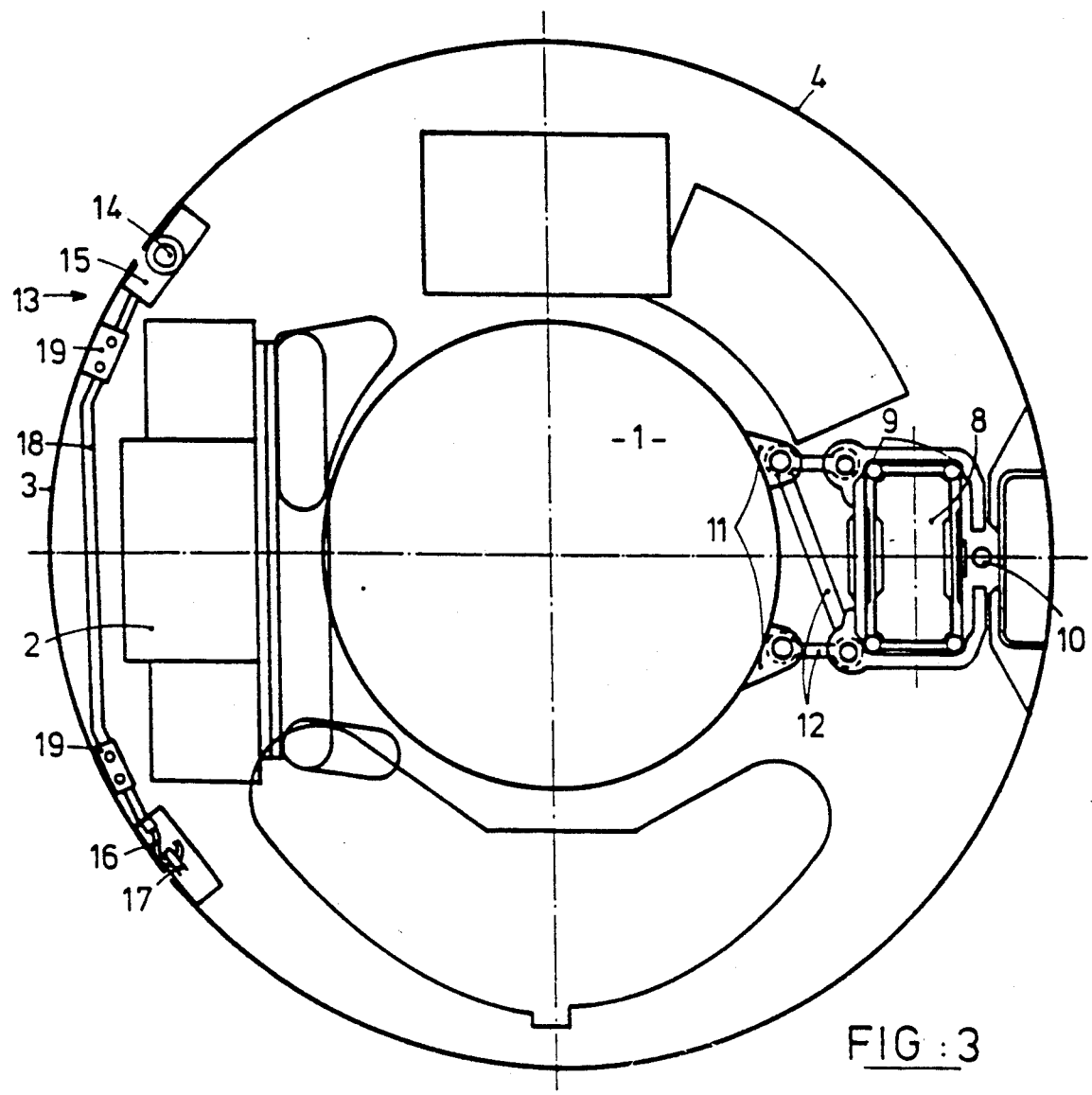

MOVABLE AIRCRAFT ENGINE COWLING

BACKGROUND OF THE INVENTION

The present relates to a movable cowling for an aircraft propulsion unit.

It is conventional practice in aircraft manufacture to mount the aircraft propulsion unit to the airframe by means of a pylon or a similar support structure. Such pylons can be used to attach the engine to the rear of the fuselage, or to mount the engine under the wing of the aircraft. In these applications, the engine is enclosed by a nacelle or a cowling to provide smooth air flow around the engine and to protect the engine. Where the engine is a turbojet engine or the like, the cowling may also define an air inlet duct.

Typical of the prior art structure is the cowling shown in U.S. Pat. No. 4,549,708 to Norris. In this structure, a rear portion of the cowling is divided into sections which are pivotally attached to the main structure on hinges such that they may be pivoted out of their closed positions to gain access to the engine.

It is also known to provide a cowling having a translating, movable portion comprising a thrust reverser. As shown in U.S. Pat. No. 4,442,987 to LeGrand et al., the thrust reverser portion is supported on a guide rail.

SUMMARY OF THE INVENTION

A movable cowling for an aircraft is disclosed having a stationary fairing portion attached to the engine support pylon and a movable cowling portion. The movable cowling portion defines a generally longitudinally extending slot to accommodate the stationary fairing portion when the movable cowling portion is in its closed position to enclose the aircraft engine.

The movable cowling portion, which may be generally annular in shape and have a generally "C"-shaped cross sectional shape, is attached to the engine by way of a telescoping beam. A portion of the beam is attached to the movable cowling and a second portion of the beam is attached to the engine. By supporting the movable cowling in this fashion, the cowling may be easily manually moved between its closed position, wherein it encloses the engine, to an open position, wherein the engine is accessible for servicing. The movable cowling moves in a direction generally parallel to the longitudinal axis of the engine such that it has no portions requiring lifting about a hinge axis.

By enabling the movable cowling portion to be moved manually, the present invention eliminates the requirement of a hydraulic or pneumatic system to open and close the cowling, thereby minimizing the weight and complexity of the housing and increasing its reliability.

A locking mechanism is provided between the movable cowling portion and the stationary fairing to lock the movable cowling portion in its closed position. The locking system absorbs both the axial and circumferential loads imposed upon the movable cowling portion during operation of the aircraft.

The locking system may comprise a hollow sleeve member mounted on the stationary fairing, a pin member mounted on the movable cowling portion and located so as to engage the hollow sleeve member when the movable cowling portion is in its closed position, a ring member located on the movable cowling portion, and a hook member mounted on the stationary fairing and located so as to engage the ring member when the movable cowling portion is in its closed position.

The telescoping beam supporting the movable cowling portion is advantageously located on the side of the movable cowling portion opposite from the stationary fairing portion and may have a polygonal cross-sectional shape.

BRIEF DESCRIPTION OF THE FIGURES

FIG. 1 is a perspective view of the cowling according to the invention with the movable cowling portion in the open position.

FIG. 2 is a diagrammatic, perspective view of the aircraft cowling shown in FIG. 1 with the movable cowling portion in the open position.

FIG. 3 is a transverse, cross-sectional view of the cowling shown in FIGS. 1 and 2.

DETAILED DESCRIPTION OF THE PREFERRED EMBODIMENT

The cowling according to the invention is illustrated in FIG. 1 in its open position to provide access to the aircraft engine 1, which in this instance is illustrated as being a turbojet-type engine driving contra-rotating unducted fan rotors 1b and 1c. Although the cowling will be described in conjunction with this type of aircraft engine, it is to be understood that it may be utilized with any type of aircraft engine without exceeding the scope of this invention.

As is well known in the prior art, the engine 1 is mounted on a support pylon 2 which is attached to the airframe structure (not shown) either at the rear of the fuselage, or under the wings of the aircraft. A stationary fairing portion 3 is attached to the pylon 2 and, in conjunction with the movable cowling portion 4 encloses the engine 1 during operation of the aircraft. The movable cowling portion 4 is generally annular in configuration and defines a generally longitudinally extending slot 4a extending partially along one side of the movable cowling portion. This gives the rear part 6 of the movable cowling portion 4 a generally "C"-shaped cross sectional configuration, while the front 5 has a generally annular shape defining an opening functioning as an air inlet duct. When the movable cowling portion 4 is in its closed position, the stationary fairing portion 3 enters the slot 4a such that the elements present an aerodynamically smooth surface completely enclosing the engine 1.

As best illustrated in FIGS. 2 and 3, the movable cowling is attached to the engine 1 by wa of attaching system 7 including a telescoping beam 8 which, in known fashion, has a plurality of sections which telescopically engage each other. The telescoping beam 8 extends generally parallel to the longitudinal axis of the engine 1 such that the movable cowling portion 4 moves in this direction between its opened and closed positions. Such longitudinal sliding movement of the movable cowling portion 4 enables the engine 1 to be substantially totally accessible when the cowling portion is in its open position, thus facilitating maintenance on the engine and its accessories.

The attaching means 7 comprises a telescoping beam 8 having a polygonal cross-sectional shape with a portion of the beam attached to the movable cowling portion 4 and a portion of the beam attached to the engine 1. The beam 8 cooperates with slides 9 located at the apexes of the polygonal cross-section. A secondary rail 10 is utilized in the attaching system 7 to absorb the stresses in the system. Its attachment to the engine 1 comprises fastening lugs 11 located on the engine which are connected to the attaching system 7 by link rods 12.

The sliding motion of the telescoping beam 8 may be enhanced by incorporating low-friction material (such as polytetrafluoroethylene) between the elements making contact at the apexes of the polygonal cross-section.

The stresses from the weight of the movable cowling portion 4 when in its open position, and the stresses from the aerodynamic forces exerted on the cowling are transmitted by the telescoping beam 8 and the link rods 12 to the fastening lugs 11 on the engine 1. The movable cowling portion 4 is displaced substantially horizontally, or at a slight angle to the horizontal, generally between ±5°. Under normal conditions, the displacement of the movable cowling portion is also generally perpendicular to the wind. As a consequence, the attaching system 7 enables the movable cowling portion 4 to be manually moved between its closed and open positions and, therefore, requires no power means whatsoever, whether mechanical, hydraulic or pneumatic.

A locking system 13 is operatively interposed between the movable cowling portion 4 and the stationary fairing 3, as also illustrated in FIG. 3. The locking means are located on adjacent edges of the "C"-shaped portion of the movable housing 4 and the stationary fairing 3. A pin member 14 is mounted on the movable cowling portion 4 and is located such that it will engage a hollow sleeve member 15 mounted on the stationary fairing 3. Adjacent opposite edges of the stationary fairing 3 and the movable cowling member 4, a ring member 17 is mounted on the movable cowling member 4 and a hook member 16 is mounted on the stationary fairing 3 such that it will engage the ring member 17 when the movable cowling 4 is in its closed position. A link rod 18 with fastening means 19 to mount it onto the stationary fairing 3 interconnects the locking means on either edge and serves to support these elements. The locking system 13 provides locking between the movable cowling portion 4 and the stationary fairing 3 in both axial and radial directions. This system provides preloading of the movable cowling 4 and is located in a plane extending generally perpendicular to the longitudinal axis of the engine. The stresses from the pre-loading are absorbed by the link rod 18.

If the cowling according to the invention is used with an engine of a different type of aircraft, such as one suspended below the wing from a generally vertically extending pylon, two telescoping beams 8 may be used on opposite sides of the movable cowling portion to attach it to the engine. Again, the telescoping beams will extend generally parallel to the longitudinal axis of the engine and will enable the movable cowling portion to be easily moved between its closed and open positions along this general direction.

The present invention minimizes the number of joints or locks required by a cowling system and, therefore, inherently reduces the potential failure of such devices in use. The movable cowling also better distributes the stresses in the structure so as to avoid stress concentrations near the joints or locks. The attaching system 7 supporting the movable cowling 4 undergoes only slight loads during the flight of the aircraft, since the rear portion of the movable cowling 4 rests on a stationary annular connector 20 attached to the engine 1 in known fashion.

The foregoing description is provided for illustrative purposes only and should not be construed as in any way limiting this invention, the scope of which is defined solely by the appended claims.

What is claimed is:

1. A cowling for an aircraft engine attached to the aircraft via a pylon mounting structure comprising:
   (a) a stationary fairing portion;
   (b) a movable cowling portion defining a slot, movable between a closed position wherein the stationary fairing is disposed in the slot such that the engine is enclosed by the movable cowling portion and the stationary fairing, and an open position wherein the movable cowling portion is displaced away from the stationary fairing portion and the engine so as to expose the engine;
   (c) attaching means to slidably attach the movable cowling portion to the engine such that the movable cowling is movable between its open and closed positions along a direction generally parallel to a longitudinal axis of the engine and,
   (d) locking means operatively associated between the movable cowling and the stationary fairing to lock the movable cowling in its closed position, wherein the locking means comprises:
      (i) a hollow sleeve member mounted on the stationary fairing;
      (ii) a pin member mounted on the movable cowling portion and located so as to engage the hollow sleeve member when the movable cowling portion is in its closed position;
      (iii) a ring member located on the movable cowling portion; and,
      (iv) a hook member mounted on the stationary fairing and located so as to engage the ring member when the movable cowling portion is in its closed position.

2. The cowling according to claim 1 wherein the sleeve member and the hook member are located in a plane extending generally perpendicular to the longitudinal axis of the engine and further comprising a link rod interconnecting the sleeve member and the hook member.

3. The cowling according to claim 1 wherein the attaching means comprises:
   (a) a telescoping beam;
   (b) means to fasten the beam to the movable cowling portion; and
   (c) means to fasten the beam to the engine.

4. The cowling according to claim 3 wherein the telescoping beam has a polygonal cross-sectional shape.

5. The cowling according to claim 3 wherein the telescoping beam is attached to a side of the movable cowling opposite from the stationary fairing.

* * * * *

UNITED STATES PATENT AND TRADEMARK OFFICE
CERTIFICATE OF CORRECTION

PATENT NO. : 5,035,379

DATED : July 30, 1991

INVENTOR(S) : Hersen et al.

It is certified that error appears in the above-identified patent and that said Letters Patent is hereby corrected as shown below:

Col. 2, line 50, delete "wa" and insert --way--.

Signed and Sealed this

Ninth Day of February, 1993

Attest:

STEPHEN G. KUNIN

Attesting Officer

Acting Commissioner of Patents and Trademarks

UNITED STATES PATENT AND TRADEMARK OFFICE
CERTIFICATE OF CORRECTION

PATENT NO.   :   5,035,379
DATED        :   July 30, 1991
INVENTOR(S)  :   HERSEN et al.

It is certified that error appears in the above-identified patent and that said Letters Patent is hereby corrected as shown below:

On the title page, Item [75]:

The inventor's name should read --Pascal-Marie P. M. Soulier--.

Signed and Sealed this

Twenty-seventh Day of April, 1993

*Attest:*

MICHAEL K. KIRK

*Attesting Officer*      *Acting Commissioner of Patents and Trademarks*